(12) United States Patent
Craig et al.

(10) Patent No.: US 10,993,374 B2
(45) Date of Patent: May 4, 2021

(54) SYSTEM AND METHOD FOR DIRECTING SOIL BUILDUP ON A CONVEYOR ON A SUGARCANE HARVESTING MACHINE

(71) Applicant: Deere & Company, Moline, IL (US)

(72) Inventors: Paul I. Craig, Thibodaux, LA (US); Kent M. Almeida, Napoleonville, LA (US); Jacob Cortez, Raceland, LA (US)

(73) Assignee: DEERE & COMPANY, Moline, IL (US)

( * ) Notice: Subject to any disclaimer, the term of this patent is extended or adjusted under 35 U.S.C. 154(b) by 161 days.

(21) Appl. No.: 15/846,697

(22) Filed: Dec. 19, 2017

(65) Prior Publication Data

US 2019/0183052 A1    Jun. 20, 2019

(51) Int. Cl.
| | |
|---|---|
| *A01F 12/56* | (2006.01) |
| *A01D 61/02* | (2006.01) |
| *B08B 1/00* | (2006.01) |
| *B08B 1/02* | (2006.01) |
| *A01D 45/10* | (2006.01) |
| *B65G 15/44* | (2006.01) |
| *B65G 45/14* | (2006.01) |

(52) U.S. Cl.
CPC ............. *A01D 61/02* (2013.01); *A01D 45/10* (2013.01); *B08B 1/006* (2013.01); *B08B 1/02* (2013.01); *B65G 15/44* (2013.01); *B65G 45/14* (2013.01); *B65G 2201/0202* (2013.01)

(58) Field of Classification Search
USPC ........................................................ 460/114
See application file for complete search history.

(56) References Cited

U.S. PATENT DOCUMENTS

| | | | |
|---|---|---|---|
| 3,460,324 A | 8/1969 | Tolar | |
| 3,828,536 A * | 8/1974 | Fowler | A01D 45/10 56/502 |
| 3,942,307 A * | 3/1976 | Quick | A01D 45/10 56/13.9 |
| 4,111,210 A | 9/1978 | Freeman et al. | |

(Continued)

FOREIGN PATENT DOCUMENTS

| | | |
|---|---|---|
| BR | 202015001250-6 U2 | 11/2016 |
| CN | 105144965 A | 12/2015 |

(Continued)

*Primary Examiner* — Thomas B Will
*Assistant Examiner* — Mai T Nguyen
(74) *Attorney, Agent, or Firm* — Taft Stettinius & Hollister LLP; Stephen F. Rost (57) ABSTRACT

A conveyor system of a sugarcane harvesting machine includes an inclined conveyor having a first shaft at a lower end and a second shaft at an upper end thereof. The belt is driven along the inclined conveyor between the first shaft and the second shaft, and the belt includes an upper portion and a lower portion between the lower end and the upper end. A floor is partially disposed between the upper portion and the lower portion of the belt, and a wiper is coupled to a bottom end of the belt such that the wiper extends from the belt in a direction towards the floor. As the upper portion of the belt travels from the lower end to the upper end of the inclined conveyor, the wiper moves with the belt and contacts and moves material that collects on a top surface of the floor.

19 Claims, 5 Drawing Sheets

(56) References Cited

U.S. PATENT DOCUMENTS

| | | | |
|---|---|---|---|
| 4,402,411 A | | 9/1983 | Lafreniere |
| 5,176,573 A | * | 1/1993 | Dow ................. A01D 67/00 460/42 |
| 5,380,247 A | * | 1/1995 | Underwood ...... A01D 41/1208 460/114 |
| 5,480,352 A | | 1/1996 | Luscombe |
| 5,857,907 A | * | 1/1999 | Underwood ...... A01D 41/1217 414/505 |
| 5,865,675 A | * | 2/1999 | Meester ............. A01D 33/10 193/27 |
| 5,930,987 A | * | 8/1999 | Urich ................ A01D 46/00 460/23 |
| 5,976,013 A | * | 11/1999 | Hamann ........... A01D 61/008 460/114 |
| 6,283,853 B1 | * | 9/2001 | Pellenc ............. G01G 3/1414 460/114 |
| 6,350,197 B1 | * | 2/2002 | Cooksey ............ A01F 12/46 460/114 |
| 9,433,149 B2 | | 9/2016 | Mixon et al. |
| 9,788,489 B2 | | 10/2017 | Jager |
| 9,974,238 B2 | * | 5/2018 | Strnad ............... A01F 12/46 |
| 2015/0173298 A1 | | 6/2015 | Jager |
| 2015/0344230 A1 | * | 12/2015 | Hollatz ............... F16H 7/12 460/114 |
| 2016/0100525 A1 | * | 4/2016 | Veikle ............... A01F 12/444 460/114 |

FOREIGN PATENT DOCUMENTS

| | | |
|---|---|---|
| EP | 0482316 B1 | 4/1992 |
| EP | 0915037 B1 | 7/2003 |
| WO | 1992004816 A1 | 4/1992 |

\* cited by examiner

SYSTEM AND METHOD FOR DIRECTING SOIL BUILDUP ON A CONVEYOR ON A SUGARCANE HARVESTING MACHINE

FIELD OF THE DISCLOSURE

The present disclosure relates to a conveyor on a sugarcane harvesting machine, and in particular to a system and method of removing soil buildup therefrom.

BACKGROUND

During operation of a sugarcane harvesting machine, sugarcane crop is generally cut near the soil in which it grows. As the crop is harvested, it is cut into smaller pieces referred to as cane billets. The billets can reach a rearward portion of the machine where it travels along a conveyor and transported to a cart or wagon. In a conventional conveyor system formed of steel, there may be a flap or other mechanism for transporting the billets upward to where it is discharged. In addition to the billets, soil and other debris may be collected by the machine. The soil and other debris may fall between gaps or openings in the conveyor system and land in undesirable locations along a floor where it continues to build. The soil buildup can be problematic because the area it collects is difficult to access and clean.

Thus, there is a need for a conveyor system on a sugarcane harvesting machine that is capable of directing or removing the soil buildup from these undesirable locations.

SUMMARY

In one embodiment of the present disclosure, a conveyor system of a sugarcane harvesting machine includes an inclined conveyor including a first shaft at a lower end and a second shaft at an upper end thereof, the inclined conveyor configured to receive cane billets at the lower end; a belt driven along the inclined conveyor between the first shaft and the second shaft, the belt including an upper portion and a lower portion between the lower end and the upper end; a floor at least partially disposed between the upper portion and the lower portion of the belt; and a wiper coupled to a bottom end of the belt, the wiper extending from the belt in a direction towards the floor; wherein, as the upper portion of the belt travels from the lower end to the upper end of the inclined conveyor, the wiper moves with the belt and is configured to contact and move material that collects on a top surface of the floor.

In one example of this embodiment, the wiper includes a plurality of wipers coupled to the bottom end of the belt and spaced from one another along a length of the belt. In a second example, the plurality of wipers is equally spaced from one another along the length of the belt. In a third example, the wiper is disposed in contact with the top surface of the floor as it travels from the lower end to the upper end. In a fourth example, the wiper does not contact the top surface of the floor as it travels from the lower end to the upper end.

In a fifth example of this embodiment, the floor and the wiper have approximately the same width. In a sixth example, the wiper may include a plurality of fingers extending from the bottom end of the belt. In a seventh example, the wiper projects upward towards a bottom surface of the floor as it travels from the upper end to the lower end.

In an eighth example of this embodiment, the conveyor system may include at least one flap coupled to a top end of the belt, the flap being configured to transport cane billets to the upper end of the inclined conveyor. In another example, the inclined conveyor includes a plurality of support rollers for supporting the belt. In yet another example, the upper shaft is rotatably driven by a motor to move the belt along the inclined conveyor. In a further example, the upper portion and lower portion are substantially parallel to one another between the lower end and the upper end. In yet a further example, the belt includes a plurality of rollers that extend transversely across a width of the belt, and the wiper is coupled to at least one of the plurality of rollers.

In another embodiment of the present disclosure, a conveyor system of a sugarcane harvesting machine includes a belt positioned between a lower end and an upper end of the system, the belt configured to transport cane billets from the lower end to the upper end; an upper portion of the belt configured to travel from the lower end to the upper end; a lower portion of the belt configured to travel from the upper end to the lower end, wherein the upper portion and the lower portion are spaced from one another and disposed approximately parallel to one another between the lower and upper ends; a floor partially disposed between the upper portion and the lower portion of the belt; and a wiper coupled to a bottom end of the belt, the wiper extending from the belt in a direction towards the floor; wherein, when coupled to the upper portion of the belt, the wiper extends downward toward a top surface of the floor and is configured to contact material that collects on the top surface; wherein, when coupled to the lower portion of the belt, the wiper extends upward toward a bottom surface of the floor.

In one example of this embodiment, the wiper includes a plurality of wipers coupled to the bottom end of the belt and spaced from one another along a length of the belt. In a second example of this embodiment, the wiper is disposed in contact with the top surface of the floor as it travels from the lower end to the upper end. In another example, the wiper includes a plurality of fingers extending from the bottom end of the belt. In yet another example, the belt may be tensioned between the lower end and upper end, or its weight may help maintain it upon support rollers or roller bars. Mechanical fasteners or the like may further couple the belt about the conveyor system.

In a further embodiment of the present disclosure, a sugarcane harvesting machine includes a main frame; at least one ground-engaging mechanism for supporting the main frame; a feed mechanism configured to receive a crop and chop it into billets; a conveyor system located at a rear portion of the machine and configured to receive the billets and transport the billets to a discharge location, the conveyor system including an inclined conveyor including a first shaft at a lower end and a second shaft at an upper end thereof, the inclined conveyor configured to receive the billets at the lower end; a belt driven along the inclined conveyor between the first shaft and the second shaft, the belt including an upper portion and a lower portion between the lower end and the upper end; a floor at least partially disposed between the upper portion and the lower portion of the belt; and a wiper coupled to a bottom end of the belt, the wiper extending from the belt in a direction towards the floor; wherein, as the upper portion of the belt travels from the lower end to the upper end of the inclined conveyor, the wiper moves with the belt and is configured to contact and move material that collects on a top surface of the floor.

In one example of this embodiment, the wiper includes a plurality of wipers coupled to the bottom end of the belt and spaced from one another along a length of the belt. In another example, the wiper is disposed in contact with the top surface of the floor as it travels from the lower end to the upper end.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

In conventional sugarcane harvesting machines, an elevator or conveyor system may receive bamboo-style crop and transport it up to a cart or wagon. Steel elevators are common in the industry, and these elevators or conveyors often include a flap or transport mechanism that pushes the material or cane billets to a top region of the conveyor. In some designs, perforations or gaps may be formed along the elevator or conveyor to allow soil and other debris to fall from the conveyor transport surface. A pair of chains may be used to drive the flaps up the elevator or conveyor system and thus transport the cane billets. Other drive mechanisms are common as well. In these designs, there is several instances of steel-on-steel contact along the length of the elevator or conveyor, and as a result there can be heavy areas or wear due to this contact.

Other similar designs have incorporated belts to convey material along the elevator or conveyor system. While these belts can reduce or eliminate some of the steel-on-steel contact, other issues can arise. One such issue is with soil or debris buildup along the elevator or conveyor system. Soil and other debris can fall through gaps and other openings in the conveyor belts, causing soil and debris buildup in locations that can be difficult to access and clean. In some instances, the buildup can affect the operation of the elevator or conveyor system.

In the present application, embodiments are presented which seek to reduce or eliminate the soil and debris buildup and improve the productivity and function of the sugarcane harvesting machine.

Figure 1:
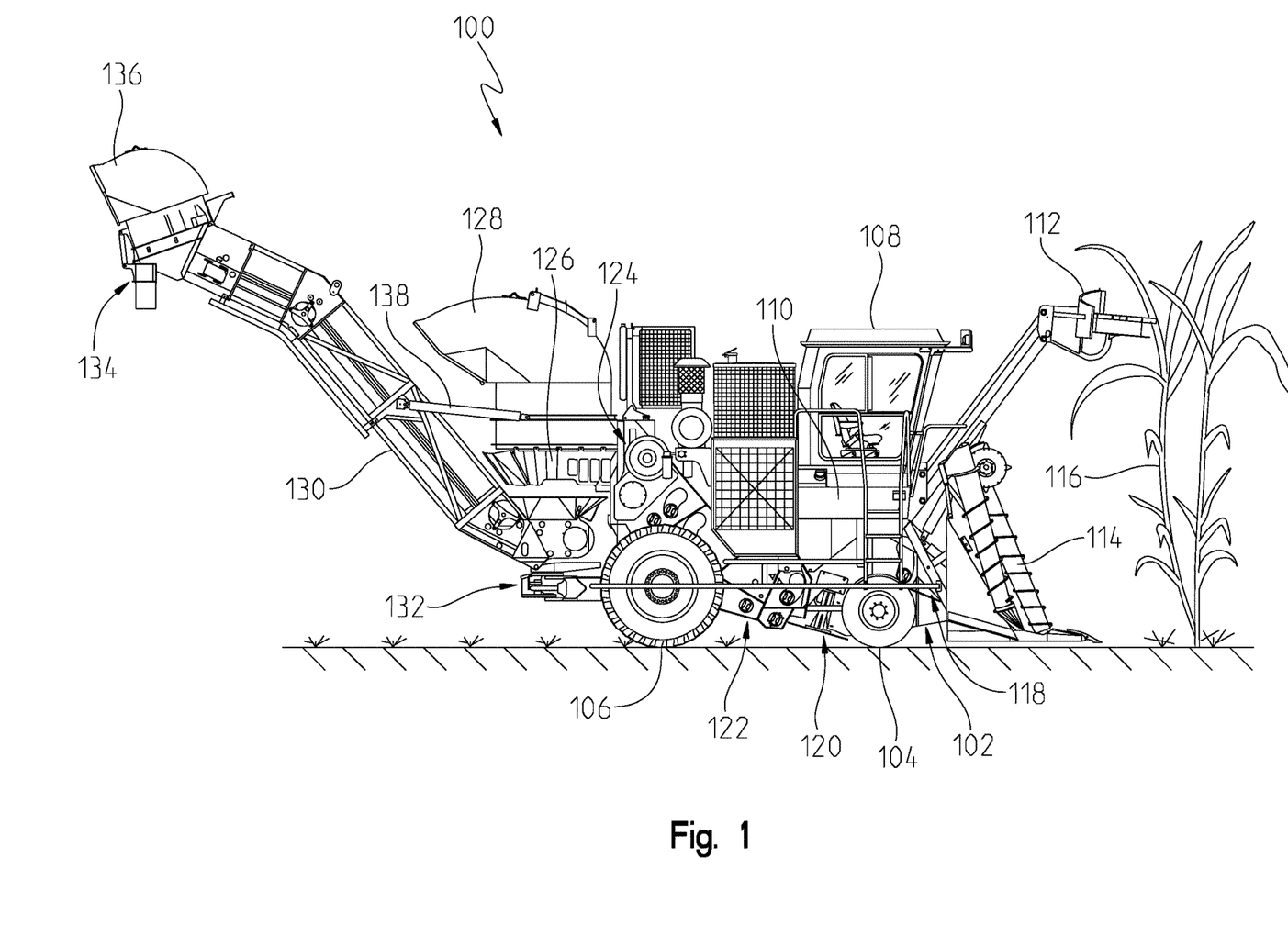
FIG. 1 is a side view of a sugarcane harvesting machine.

Turning now to FIG. 1 of this disclosure, an embodiment of a sugarcane harvesting machine 100 is shown. The harvester or machine 100 is presented in a side view in FIG. 1, with the front of the machine 100 facing to the right. Accordingly, certain left-side components of the machine 100 may not be visible in FIG. 1.

The machine 100 may include a main frame 102 supported on track assemblies (not shown) or wheels (i.e., a front wheel 104 and a rear wheel 106), with a cab 108 adapted to house an operator. The cab 108 may include a plurality of controls for controlling the operation of the machine 100. An engine 110 or other power system may supply power for driving the machine 100 along a field and for powering various driven components of the machine. In certain embodiments, the engine 110 may directly power a hydraulic pump (not shown), and various driven components of the harvester may be powered by hydraulic motors (not shown) receiving hydraulic power from the hydraulic pump via an embedded hydraulic system (not shown).

A cane topper 112 may extend forward of the frame 102 in order to remove the leafy tops of sugarcane plants 116, and a set of crop dividers 114 (only the right-side divider shown in FIG. 1) may then guide the remainder of the sugarcane toward internal mechanisms of the machine 100 for processing. As the sugarcane harvesting machine 100 moves across a field, plants 116 passing between the crop dividers 114 may be deflected downward by one or more knockdown rollers 118 before being cut near the base of the plants by a base cutter assembly 120 mounted on the main frame 102. Rotating disks, guides, or paddles (not shown) on the base cutter assembly 120 may further direct the cut ends of the plants upwardly and rearward within the harvester 100 toward a feeding mechanism such as successive pairs of upper and lower feed rollers (not shown). The feeding mechanism may be rotatably supported by a chassis 122, and may be rotatably driven by a hydraulic motor or other device (not shown) in order to convey the stalks toward a chopper drum module 124 for chopping into relatively uniform billets.

The chopper drum module 124 may include upper and lower chopper drums which may rotate in opposite directions around, respectively, parallel axes (not shown) in order to chop the passing stalks into billets and propel the billets into a cleaning chamber 126 at the base of a first or primary extractor 128. The first extractor 128 may utilize a powered fan to extract trash and debris from the cleaning chamber 126.

As also shown in FIG. 1, a loading conveyor or elevator system 130 may be provided at a rear portion of the harvester. The loading conveyor or elevator system 130 may include a forward end located at the bottom of the cleaning chamber 126, and the system may then convey the cleaned billets upward to a discharge location 134 near or below a second extractor 136. The billets may be discharged via the second extractor 136 into a trailing truck, cart, wagon or other receptacle (not shown).

The elevator or conveyor system 130 may be coupled to a swing table or pivot bearing 132, as shown in FIG. 1. As such, the entire system 130 is capable of pivoting up to or about 180° to unload the billets from either side of the machine 100.

Figure 2:
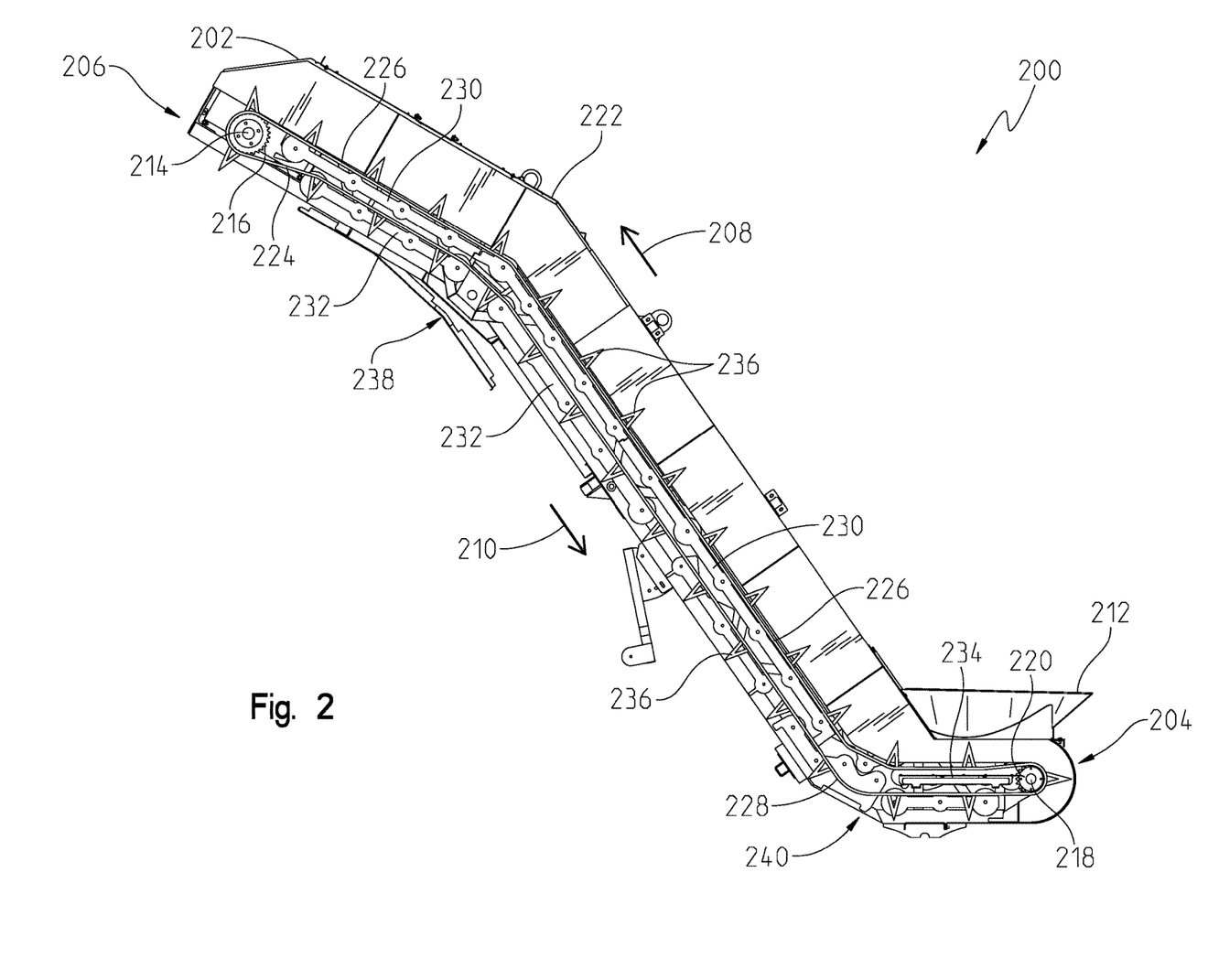
FIG. 2 is a side view schematic of a conveyor system on a sugarcane harvesting machine.

Referring now to FIG. 2, one embodiment of a conveyor system 200 is shown. In this embodiment, the conveyor system 200 includes an inclined conveyor 202 having a conveyor frame 222, support arms, and the like for supporting the overall structure. The conveyor system 200 may be located towards a rear portion of the sugarcane harvesting machine 100 of FIG. 1, for example. The inclined conveyor 202 may include a first, lower end 204 and a second, upper end 206. Sugarcane billets (not shown) may be received via a basket 212 or funnel. Although not shown, an extractor such as the first extractor 128 of FIG. 1 may be located adjacent the basket 212. During operation, the sugarcane billets may pass through the basket 212 and be received at the first end 204 of the conveyor 202. The extractor may include a suction blower or other similar apparatus for drawing debris (i.e., leaves) and other impurities from the sugarcane billets that are received by the inclined conveyor 202.

The billets may fall onto a belt 224 that is tensioned about the first end 204 and the second end 206. In particular, the belt 224 may be driven between the two ends by a motor (not shown) or other power-generating device. The motor may rotatably drive a drive shaft 214 at the second end of the conveyor 202. A drive gear 216 may be situated about the drive shaft 214 such that the drive gear 216 is connected to the belt 224. The belt 224 may further be connected to a driven gear 220, which is situated about a driven shaft 218 as shown in FIG. 2.

The belt 224 is only generally shown in FIG. 2. It may be formed of a steel or other known material. The belt 224 may include an upper portion 226 that travels in an upward direction as indicated by arrow 208, and a lower portion 228 that travels in a downward direction as indicated by arrow 210. In other words, the upper portion 226 travels in the upward direction 208 between the lower end 204 and the upper end 206 of the conveyor 202, and the lower portion 228 travels in the downward direction 210 between the upper end 206 and the lower end 208. The only times the belt does not travel in either direction is when it is traveling around the drive gear 216 and driven gear 220.

As the belt 224 is driven about the inclined conveyor 202, it may be supported by various rollers or roller bars. For instance, as shown in FIG. 2, the upper portion 226 of the belt 224 may travel along one or more upper support roller bars 230. Further, the lower portion 228 of the belt 224 may travel along one or more lower support roller bars 232. Each roller bar may include one or more rollers which come into contact with an underside or side of the belt 224. The rollers may freely rotate about their own respective rotational axis to facilitate smooth movement of the belt 224 about the inclined conveyor 202. Each support roller bar may be the same as the others, or in some cases, the roller bars may differ from one another. For example, the conveyor 202 may not be inclined in a direct manner. As shown in FIG. 2, the conveyor 202 may include a first deflection 238 toward the upper end 206 and a second deflection 240 toward the lower end 204. A deflection roller or the like may be used to facilitate the movement of the belt 224 about the first and second deflections.

The conveyor system 200 may also include one or more transport mechanisms 236 integrally formed with or coupled to the belt 224. Each transport mechanism 236 is configured to assist with the transportation of the billets from the lower end 204 to the upper end 206. Each transport mechanism 236 may include an A-shaped or triangularly-shaped cross-section. Other cross-sections and designs are possible for the transport mechanism 236. For purposes of this disclosure, the transport mechanism 236 may be referred to as a slat or flap, and its purpose is to facilitate the transport of billets to the discharge location at the second end 206 of the inclined conveyor 202.

Figure 3:
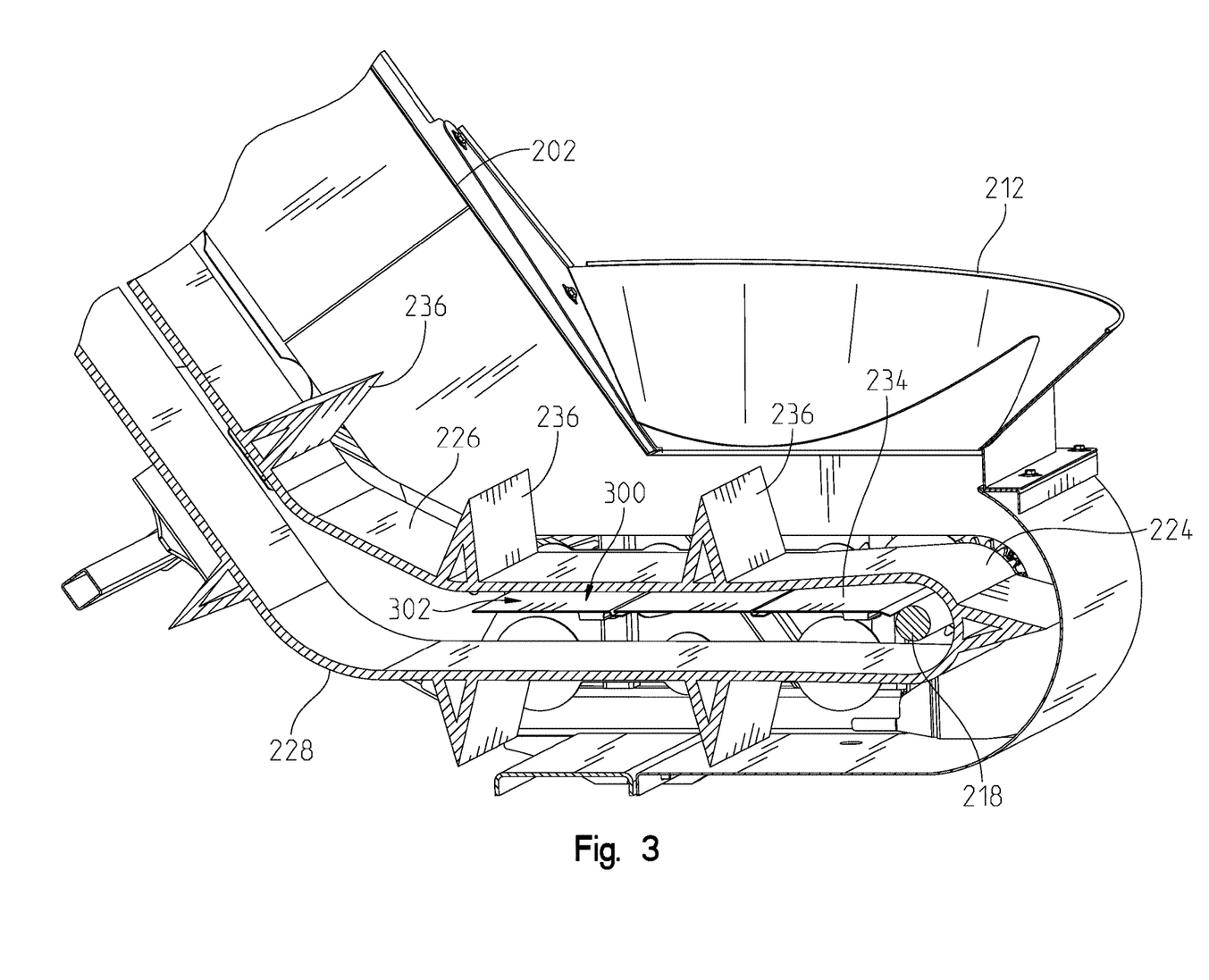
FIG. 3 is a partial side perspective view of a portion of the conveyor system of FIG. 2.

The inclined conveyor 202 is also shown to include a conveyor floor 234. The conveyor floor 234 may be disposed near the first end 204 of the conveyor 202 and adjacent to the driven gear 220. In addition, the floor 234 may be disposed at least partially between the upper portion 226 and the lower portion 228 of the belt 224. The position or location of the floor 234 is such that soil, debris, impurities, etc. that are not removed by the extractor may fall through gaps or openings in the belt 224 and collect on the floor 234. As shown in FIG. 3, the floor 234 may include a substantially planar top surface 300 disposed just beneath the upper portion 226 of the belt 224. In particular, a small space or gap 302 is formed between the top surface 300 of the floor 234 and the upper portion 226 of the belt 224. In some instances, only a few inches or less of space is defined between the belt 224 and the floor 234. It is due to this confined space that access is limited. Moreover, due to the limited access, it is often difficult to clean the top surface 300 of the floor 234 from debris, soil, and impurities that collect there. Soil, debris and other impurities can build up and possibly interfere with the operation of the belt 224 and other components of the conveyor system 200. It may be necessary to shut down the machine and remove various panels or hardware from the machine in order to access this area to clean the floor 234. This can be unproductive and inefficient, and thus there is need to develop a better means for cleaning debris from the floor 234.

Figure 4:
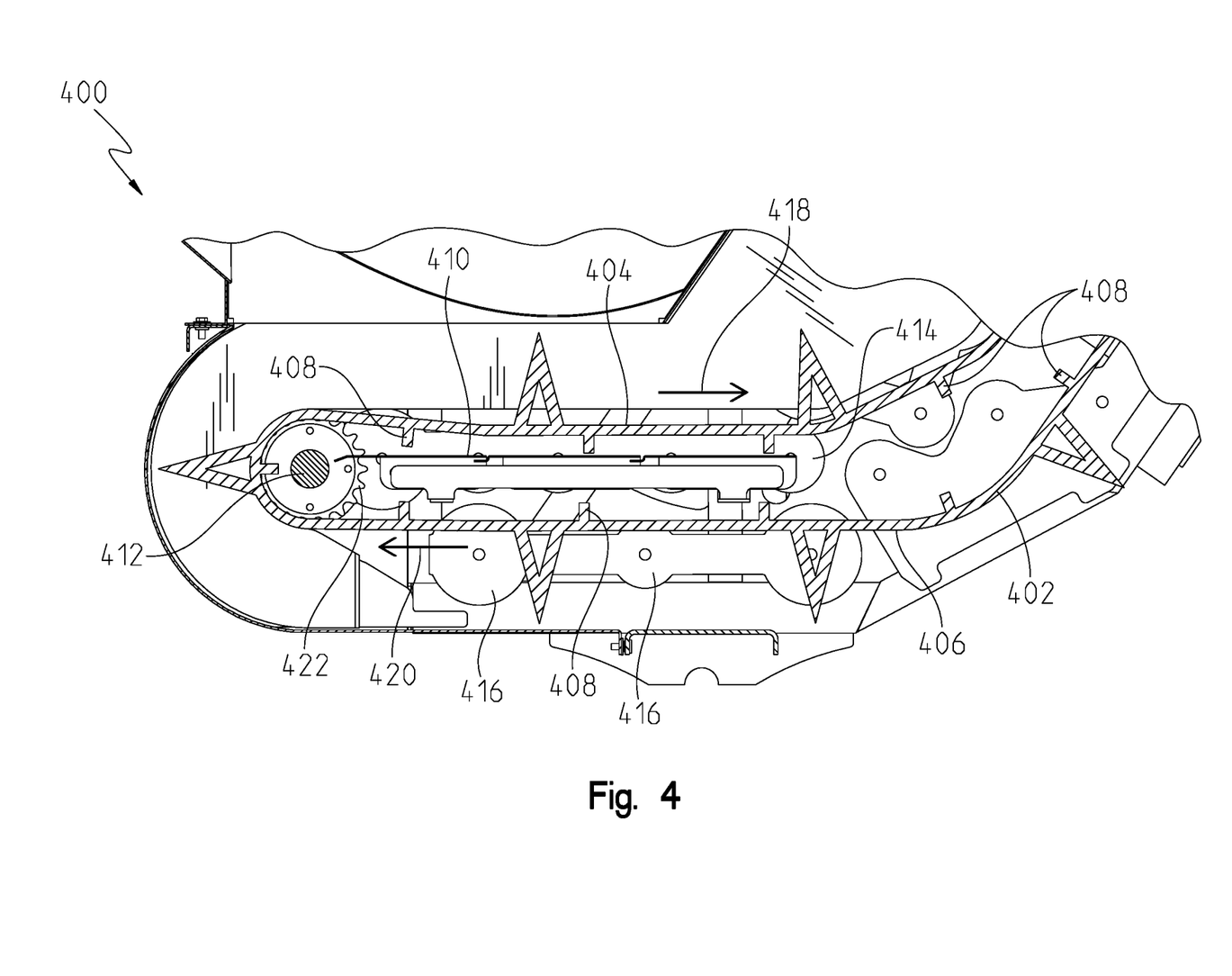
FIG. 4 is a side view schematic of a conveyor system having one or more wipers.

Referring to FIG. 4, a portion of another embodiment of a conveyor system 400 is shown. Here, the conveyor system 400 includes a belt 402 having an upper portion 404 and a lower portion 406. In FIG. 4, the belt 402 is shown traveling around a driven shaft 412 and driven gear 422, which are similar to the driven shaft 218 and driven gear 220 of FIG. 2. The upper portion 404 of the belt 402 may travel along an upper roller support bar 414 and the lower portion 404 may travel along a lower roller support bar 416. Each support bar may include one or more rollers configured to freely rotate about their respective axis.

Similar to the embodiment of FIG. 2, the upper portion 404 of the belt 402 may travel in a generally upward direction indicated by arrow 418 from a lower end 204 to an upper end 206 of a conveyor 202. Moreover, the lower portion 406 of the belt 402 may travel in a generally downward direction indicated by arrow 420 from the upper end 206 to the lower end 204 of the conveyor 202.

The conveyor system 400 is also shown as including a conveyor floor 410. The conveyor floor 410 may include a substantially planar top surface, and it may be disposed between the upper portion 404 and the lower portion 406 of the belt 402. In this manner, the floor 410 is similar to the conveyor floor 234 of FIG. 2.

As also shown in FIG. 4, a wiper 408 may be coupled to a bottom end of the belt 402. The wiper 408 may be several inches in length, or it may be as long as the gap between the belt 402 and the top surface of the floor 410. In some instances, the length of the wiper 408 may be such that it contacts the top surface of the floor 410. In other instances, there may be a small gap (e.g., 0.25" or less) between the wiper 408 and the floor 410. In any event, the wiper 408 may be connected to the belt 402 in some manner and move relative to the floor 410. As shown in FIG. 4, the wiper 408 may be disposed to come into contact with soil, mud, debris and other impurities that collect on the top surface of the floor 410 and redirect these materials to a more desirable location. As such, the machine does not need to be shut down or serviced in order to clean the debris and other materials from building up on the floor 410.

The wiper 408 may be formed of rubber, plastic or steel. In one embodiment, the wiper 408 is formed of a rubber material to improve durability and not scratch or damage the floor 410. In another embodiment, the wiper 408 may be formed of the same material as the belt 402.

In one embodiment (not shown), there may be a pair of belts on both sides of the conveyor and the plurality of rods extend between the pair of belts. For example, the drive shaft (not shown) and driven shaft 412 may have gears or pulleys on both sides of the conveyor such that one belt is coupled to the gears or pulleys on one side and the other belt is coupled to the gears or pulleys on the opposite side thereof. Thus, the plurality of rods may be coupled to both belts and extend transverse to the direction of travel between the first end 204 and the second end 204 of the conveyor 202. The wiper 408 or plurality of wipers 408 may be coupled to the rods or to the bottom portion of the belts.

In an alternative embodiment (not shown in FIG. 4), the belt 402 may be formed on top of a plurality of cylindrical rods that extend the width of belt 402. The rods may be formed of steel or other material. The rods and belt 402 may be driven by the power-generating mechanism as described above. In this embodiment, the wiper 408 may be coupled to the rods which are disposed beneath the belt 402. In one example, the wiper 408 may be bolted or otherwise mechanically fastened to the rods. In another example, the wiper 408 may be integrally formed with the rods.

As shown in FIG. 4, the wiper 408 is located on a bottom side of the belt 402. Thus, with reference to the upper portion 404 of the belt 402, the wiper 408 is oriented downward towards the top surface of the floor 410. As described above, this allows the wiper 408 to move any debris or soil from the floor 410, particularly as the space between the belt and floor is confined and difficult to access. It is also noteworthy that while the transport mechanism 236 of FIG. 2 is not shown in FIG. 4, it is possible in other embodiments for the belt 402 to include one or more transport mechanisms. In these other embodiments, the transport mechanism will project or extend in a direction opposite the wiper 408. In other words, with respect to the upper portion 404 of the belt 402, the transport mechanism may extend upward to carry the billets to the top of the conveyor system 400, whereas the wiper 408 extends downward to remove material from the floor 410.

In addition, the wiper 408 on the lower portion 406 of the belt 402 is shown extending upward towards the bottom side of the floor 410. The belt 402 in FIG. 4 may include a plurality of wipers 408. The number of wipers 408 may depend upon the length of the belt 402. In the case of a plurality of wipers, each wiper 408 may be spaced equally to the next closest wiper 408 along the length of the belt 402. Alternatively, other patterns of how the plurality of wipers 408 are spaced from one another is possible.

Figure 5:
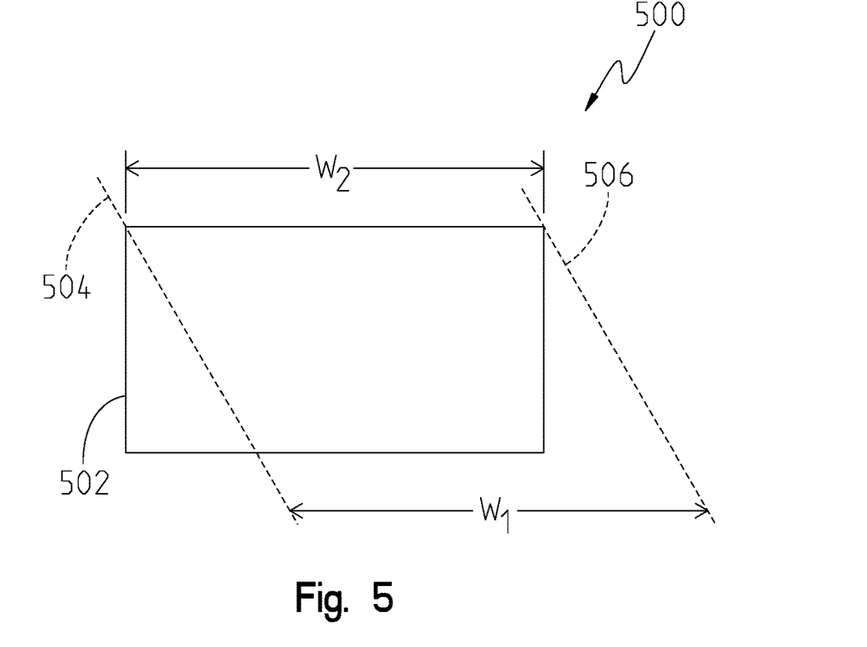
FIG. 5 is a schematic of one example of a wiper for a conveyor system.

Referring to FIG. 5, an example of a belt assembly 500 is shown. Here, the belt assembly 500 may include a belt have a first side 504 and a second side 506. The width, $W_1$, of the belt assembly 500 is defined between the first side 504 and the second side 506.

A wiper 502 is shown extending downward from the belt assembly 500. The wiper 502 may be formed of any material including a rubber, plastic or steel. The wiper 502 may include a uniform width, $W_2$, that is substantially the same as the width, $W_1$, of the belt assembly 500. Moreover, the wiper 502 may have a uniform length across the width as shown.

Figure 6:
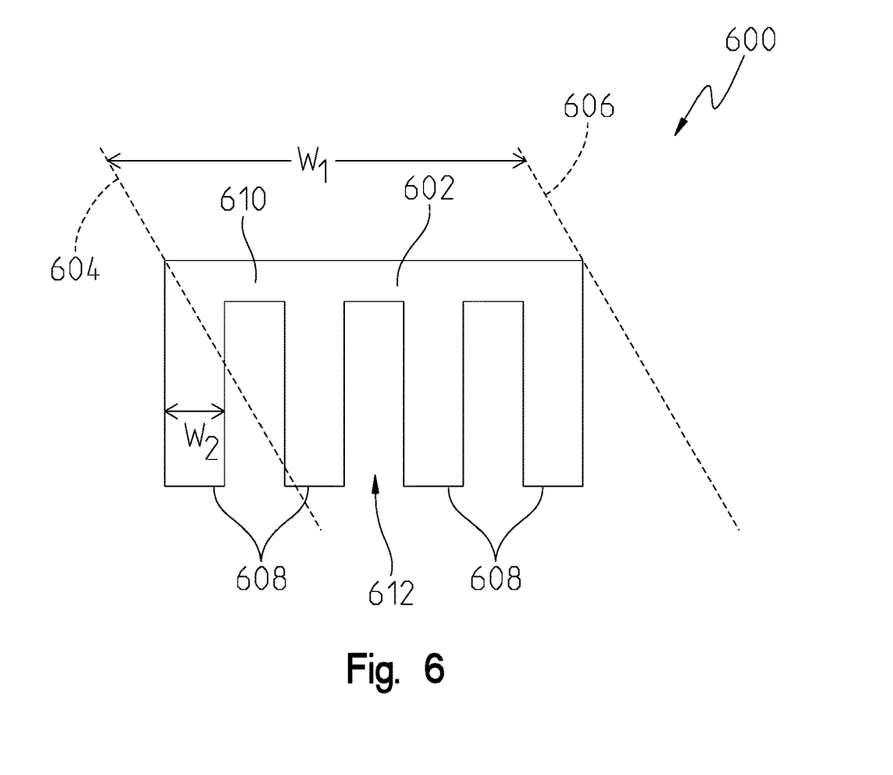
FIG. 6 is a schematic of another example of a wiper for a conveyor system.

In contrast, a different embodiment of a belt assembly 600 is shown in FIG. 6. In this embodiment, the belt assembly 600 again includes a first side 604 and a second side 606 which define the overall width, $W_1$, of the belt assembly 600. A wiper 602 is shown extending downward from the belt assembly 600 so that it is able to contact and remove material from the conveyor floor (not shown). In this embodiment, the wiper 602 has a different design from the one in FIG. 5. Here, the wiper 602 may include a main body or portion 610 that spans the width, $W_1$, of the belt assembly 600. Below the main body or portion 610, however, the wiper 602 may form a plurality of fingers 608. A gap or space 612 may be defined between adjacent fingers 608. As such, each finger 608 may have a width, $W_2$, which is less than the overall width, $W_1$, of the main body or portion 610 of the wiper 602.

In one embodiment of the present disclosure, a conveyor system may include a belt assembly having a plurality of wipers. In one example of this embodiment, the plurality of wipers may include a design similar to the wipers 502 of FIG. 5. In a second example, the plurality of wipers may include a design similar to the wiper 602 of FIG. 6. In a further example, the plurality of wipers may include both designs of FIGS. 5 and 6. Other designs of wipers are contemplated by this disclosure, and one skilled in the art may design the wipers to have two or more fingers of varying length, width, thickness, cross-section, material, and the like. Moreover, the conveyor system having a belt with a plurality of wipers may be constructed such that one wiper may have a design such as that shown in FIG. 5, a subsequent wiper may be constructed like the one in FIG. 6 having four fingers, another wiper may have a design such as the one in FIG. 6 but with a different number of fingers, and so on. It is also contemplated that one wiper constructed like that of FIG. 6 may have four fingers with three defined gaps therebetween, and the next wiper may only have three fingers but which are constructed to align with the three defined gaps of the previous wiper. As a result, the plurality of wipers is able to effectively remove material from the underlying floor across its entire width.

Regardless of the design, for purposes of removing material from the conveyor floor, each wiper may be coupled to the bottom side of the belt. Moreover, in yet a further embodiment, it is contemplated that the wipers may be removably coupled to the belt such that the wipers can be removed at any time, moved to any location on the belt, or additional wipers may be added to the belt.

It is further contemplated in this disclosure that one or more transport mechanisms may be coupled to the belt on a side opposite the wipers. The transport mechanisms may be disposed at locations along the length of the belt where the wipers are not coupled. Alternatively, it is possible for one or more the transport mechanisms to be coupled to the belt at the same location as one of the wipers.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A conveyor system of a sugarcane harvesting machine, comprising:
   an inclined conveyor including a lower end and an upper end thereof, the inclined conveyor configured to receive cane billets at the lower end;
   a belt including a length, a top side, and a bottom side, the belt driven along the inclined conveyor between the lower end and the upper end, the belt including an upper portion and a lower portion between the lower end and the upper end;
   a floor at least partially disposed between the upper portion and the lower portion of the belt;
   at least one flap coupled to the top side of the belt, the flap configured to transport cane billets to the upper end of the inclined conveyor; and
   at least one wiper coupled to the bottom side of the belt, the wiper extending from the bottom side of the belt in a direction towards the floor, wherein the at least one wiper is offset from the at least one flap along the length of the belt;

wherein, as the upper portion of the belt travels from the lower end to the upper end of the inclined conveyor, the wiper moves with the belt and is configured to contact and move material that collects on a top surface of the floor.

2. The conveyor system of claim 1, wherein the at least one wiper comprises a plurality of wipers coupled to the bottom side of the belt and spaced from one another along a length of the belt.

3. The conveyor system of claim 2, wherein the plurality of wipers is equally spaced from one another along the length of the belt.

4. The conveyor system of claim 1, wherein the at least one wiper is disposed in contact with the top surface of the floor as it travels from the lower end to the upper end.

5. The conveyor system of claim 1, wherein the floor and the at least one wiper have approximately the same width.

6. The conveyor system of claim 1, wherein the at least one wiper comprises a plurality of fingers extending from the bottom end of the belt.

7. The conveyor system of claim 6, wherein:
the at least one wiper comprises a plurality of wipers coupled to the bottom end of the belt and spaced from one another along a length of the belt;
a first wiper of the plurality of wipers comprises a first plurality of fingers, wherein each of the first plurality of fingers is spaced from the other of the plurality of fingers to define gaps therebetween; and
a second wiper of the plurality of wipers comprises a second plurality of fingers, wherein the second wiper is aligned with the first wiper such that the second plurality of fingers is aligned with the gaps defined between the first plurality of fingers.

8. The conveyor system of claim 1, wherein the at least one wiper projects upward towards a bottom surface of the floor as it travels from the upper end to the lower end.

9. The conveyor system of claim 1, wherein the inclined conveyor comprises a plurality of support rollers for supporting the belt.

10. The conveyor system of claim 1, wherein the upper shaft is rotatably driven by a motor to move the belt along the inclined conveyor.

11. The conveyor system of claim 1, wherein the upper portion and lower portion are substantially parallel to one another between the lower end and the upper end.

12. The conveyor system of claim 1, wherein the belt comprises a plurality of rollers that extend transversely across a width of the belt, and the at least one wiper is coupled to at least one of the plurality of rollers.

13. A sugarcane harvesting machine, comprising:
a main frame;
at least one ground-engaging mechanism for supporting the main frame;
a feed mechanism configured to receive a crop and chop it into billets;
a conveyor system located at a rear portion of the machine and configured to receive the billets and transport the billets to a discharge location, the conveyor system comprising:
an inclined conveyor including a lower end and an upper end, the inclined conveyor configured to receive the billets at the lower end;
a belt including a length, a top side, and a bottom side, the belt driven along the inclined conveyor between the lower and upper ends of the inclined conveyor, the belt including an upper portion and a lower portion between the lower end and the upper end;
a floor at least partially disposed between the upper portion and the lower portion of the belt;
at least one flap coupled to the top side of the belt, the flap configured to transport can billets to the upper end of the inclined conveyor; and
at least one wiper coupled to bottom side of the belt, the wiper extending from the bottom side of the belt in a direction towards the floor, wherein the at least one wiper is offset from the at least one flap along the length of the belt;
wherein, as the upper portion of the belt travels from the lower end to the upper end of the inclined conveyor, the wiper moves with the belt and is configured to contact and move material that collects on a top surface of the floor.

14. The sugarcane harvesting machine of claim 13, wherein the at least one wiper comprises a plurality of wipers coupled to the bottom side of the belt and spaced from one another along a length of the belt.

15. The sugarcane harvesting machine of claim 13, wherein the at least one wiper is disposed in contact with the top surface of the floor as it travels from the lower end to the upper end.

16. A conveyor system of a sugarcane harvesting machine, comprising:
a belt positioned between a lower end and an upper end of the system to transport cane billets therebetween;
an upper portion of the belt configured to travel from the lower end to the upper end;
a lower portion of the belt configured to travel from the upper end to the lower end, wherein the upper portion and the lower portion are spaced from one another and disposed approximately parallel to one another between the lower and upper ends;
a floor partially disposed between the upper portion and the lower portion of the belt;
at least one flap coupled to the top side of the belt, the flap configured to transport cane billets to the upper end of the inclined conveyor; and
at least one wiper coupled to a bottom side of the belt, the wiper extending from the belt in a direction towards the floor, wherein the at least one wiper is offset from the at least one flap along the length of the belt;
wherein, when coupled to the upper portion of the belt, the at least one wiper extends downward toward a top surface of the floor and is configured to contact material that collects on the top surface;
wherein, when coupled to the lower portion of the belt, the at least one wiper extends upward toward a bottom surface of the floor.

17. The conveyor system of claim 16, wherein the at least one wiper comprises a plurality of wipers coupled to the bottom side of the belt and spaced from one another along a length of the belt.

18. The conveyor system of claim 16, wherein the at least one wiper is disposed in contact with the top surface of the floor as it travels from the lower end to the upper end.

19. The conveyor system of claim 16, wherein the at least one wiper comprises a plurality of fingers extending from the bottom end of the belt.

* * * * *